United States Patent
Duquesne et al.

(10) Patent No.: US 12,120,984 B2
(45) Date of Patent: Oct. 22, 2024

(54) BUBBLE UP AUGER FOR COMBINE HARVESTER

(71) Applicant: CNH Industrial America LLC, New Holland, PA (US)

(72) Inventors: Frank R. G. Duquesne, Zwevegem (BE); Jean-Pierre Vandendriessche, Erpe-Mere (BE); Jason Musheno, Lancaster, PA (US); Kyle Lensch, Bennett, IA (US); Michael Minnich, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 684 days.

(21) Appl. No.: 17/376,509

(22) Filed: Jul. 15, 2021

(65) Prior Publication Data

US 2023/0020643 A1    Jan. 19, 2023

(51) Int. Cl.
*A01D 90/02* (2006.01)
*A01D 41/12* (2006.01)
*A01D 61/00* (2006.01)
*A01F 12/46* (2006.01)
*B65G 33/08* (2006.01)

(52) U.S. Cl.
CPC ......... *A01D 90/02* (2013.01); *A01D 41/1208* (2013.01); *A01D 61/008* (2013.01); *A01F 12/46* (2013.01); *B65G 33/08* (2013.01); *B65G 2201/042* (2013.01)

(58) Field of Classification Search
CPC .. A01D 61/008; A01D 41/1208; A01D 90/02; A01D 90/10; A01D 41/1217; A01F 12/46
See application file for complete search history.

(56) References Cited

U.S. PATENT DOCUMENTS

| | | | |
|---|---|---|---|
| 2,783,906 A * | 3/1957 | Helms ............... | A01D 61/00 198/586 |
| 3,152,702 A * | 10/1964 | Klemm ............ | A01D 41/1217 56/473.5 |
| 3,550,793 A | 12/1970 | Davidow et al. | |
| 3,560,133 A | 2/1971 | Ryczek | |

(Continued)

FOREIGN PATENT DOCUMENTS

| | | |
|---|---|---|
| DE | 4419435 A1 | 12/1995 |
| EP | 3649845 A1 | 5/2020 |

OTHER PUBLICATIONS

Extended European Search Report dated Dec. 6, 2022 for EP Application No. 22182639.9 (8 pages).

*Primary Examiner* — Thomas B Will
*Assistant Examiner* — Julia C Tran
(74) *Attorney, Agent, or Firm* — Peter K. Zacharias; Rebecca L. Henkel; Rickard K. DeMille (57) ABSTRACT

A bubble-up auger for a combine harvester includes a rotatable shaft, a lower auger section either mounted to or forming part of the rotatable shaft, and an upper auger section that is removably connected to the lower auger section, and includes an opening through which the shaft is at least partially positioned. The upper auger section is moveable between a first position where the upper auger section is detached from the lower auger section and a second position where the upper auger section is connected to the lower auger section.

14 Claims, 5 Drawing Sheets

(56) References Cited

U.S. PATENT DOCUMENTS

| | | | | |
|---|---|---|---|---|
| 3,938,683 A * | 2/1976 | Bichel | B60P 1/40 | |
| | | | 414/502 | |
| 4,029,228 A * | 6/1977 | Shaver | B60P 1/40 | |
| | | | 414/293 | |
| 4,067,343 A * | 1/1978 | Muijs | A01D 41/12 | |
| | | | 198/642 | |
| 5,695,399 A | 12/1997 | Carlson et al. | | |
| 6,248,015 B1 * | 6/2001 | Rayfield | A01D 41/1208 | |
| | | | 460/131 | |
| 6,422,376 B1 * | 7/2002 | Nichols | B65G 33/32 | |
| | | | 198/632 | |
| 9,102,478 B2 * | 8/2015 | Van Mill | B65G 33/265 | |
| 9,723,783 B2 | 8/2017 | Patterson et al. | | |
| 9,775,297 B2 | 10/2017 | Ricketts et al. | | |
| 9,907,228 B2 | 3/2018 | Vandevelde et al. | | |
| 10,399,787 B2 | 9/2019 | Rodrigues et al. | | |
| 10,743,474 B1 * | 8/2020 | Schlimgen | B65G 41/008 | |
| 2007/0102260 A1 * | 5/2007 | Reimer | A01D 41/1217 | |
| | | | 198/313 | |
| 2007/0172338 A1 | 7/2007 | Reimer et al. | | |
| 2008/0092504 A1 * | 4/2008 | Voss | A01D 41/1217 | |
| | | | 56/16.6 | |
| 2010/0209223 A1 | 8/2010 | Van Mill et al. | | |
| 2014/0066149 A1 * | 3/2014 | Dise | A01F 12/46 | |
| | | | 460/114 | |
| 2014/0329572 A1 * | 11/2014 | McCully | A01F 12/46 | |
| | | | 460/114 | |
| 2015/0237804 A1 * | 8/2015 | Van Mill | B60P 1/42 | |
| | | | 414/523 | |
| 2016/0319857 A1 * | 11/2016 | Patterson | A01D 41/1217 | |
| 2018/0244477 A1 * | 8/2018 | Stilborn | B60P 1/42 | |
| 2020/0128736 A1 * | 4/2020 | Banks, Jr. | B65G 33/32 | |
| 2020/0229350 A1 | 7/2020 | Horst et al. | | |
| 2020/0367436 A1 * | 11/2020 | Schlimgen | B65G 33/32 | |

* cited by examiner

BUBBLE UP AUGER FOR COMBINE HARVESTER

FIELD OF THE INVENTION

The present invention relates to agricultural harvesters. More specifically, the present invention relates to a bubble up auger for a combine harvester.

BACKGROUND OF THE INVENTION

As is described in U.S. Pat. No. 9,775,297 to CNH America LLC (the '297 patent), which is incorporated by reference in its entirety and for all purposes, a combine harvester generally includes a header which cuts the crop. The header then moves the cut crop into a feeder house. The feeder house lifts the cut crop into the threshing, separation and cleaning areas of the agricultural combine. The grain is separated from crop stalk by a rotor or threshing system. The grain is then cleaned, transported, and stored in a grain tank. The chaff and trash are deposited from the rear of the agricultural combine. The grain stored in the grain tank is eventually discharged through a grain tank unloader tube.

More particularly, grain enters a clean grain elevator typically positioned on one side of the combine. The elevator is an endless chain elevator with a series of lift arms attached to the chain. The arms lift the grain upwards. Near the top of the elevator the grain is deposited to a base of a bubble up auger. The bubble up auger moves the grain towards the center of the grain tank. At the end of the bubble up auger the grain is discharged into the grain tank's center. Conventional bubble up augers are hinged near the base of the auger so that the auger can rotate or pivot to a transport, or substantially horizontal position. To discharge the grain from the grain tank, there is an auger positioned at the bottom of the grain tank. This grain tank auger moves grain to a grain tank unloading auger. The grain tank unloading auger is extended away from the grain tank and discharges the grain into a nearby transport vehicle.

The bubble up auger is hinged at the base of the auger, as mentioned above. The auger may be divided into an upper portion that is pivotably mounted to a stationary lower portion. The ends of the upper and lower auger portions typically include bearings and hangers for those bearings. Such bearings and bearing hangers add cost, complexity and reduce efficiency. Specifically, bearing hangers can create interruptions and flow restrictions that increase wear on auger components. These interruptions also consume more power throughout the grain handling system, and can damage clean grain. Bearings consume power (i.e., windage losses) as they are often filled with oil or grease that consume power to overcome the fluid friction forces (hydrodynamic forces).

The absence of a bearing on the upper end of the lower bubbler auger would improve efficiency of the system due to power consumed in rotating a bearing during operation. Moreover, the absence of a bearing hanger in the upper portion of the lower auger also allows the upper auger and lower auger flightings to be closer in proximity in a folding auger system. Minimizing separations between flighting in folding auger systems improves efficiency, and results in less grain damage.

SUMMARY OF THE INVENTION

According to one aspect of the invention, a bubble-up auger for a combine harvester includes a rotatable shaft, a lower auger section either mounted to or forming part of the rotatable shaft, and an upper auger section that is removably connected to the lower auger section, and includes an opening through which the shaft is at least partially positioned. The upper auger section is moveable between a first position where the upper auger section is detached from the lower auger section and a second position where the upper auger section is connected to the lower auger section.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "chaff", "straw", and "tailings" are used principally throughout this specification for convenience but it is to be understood that these terms are not intended to be limiting. Thus "grain" refers to that part of the crop material that is threshed and separated from the discardable part of the crop material, which is referred to as chaff and includes straw, seeds, and other non-grain crop material.

Figure 1:
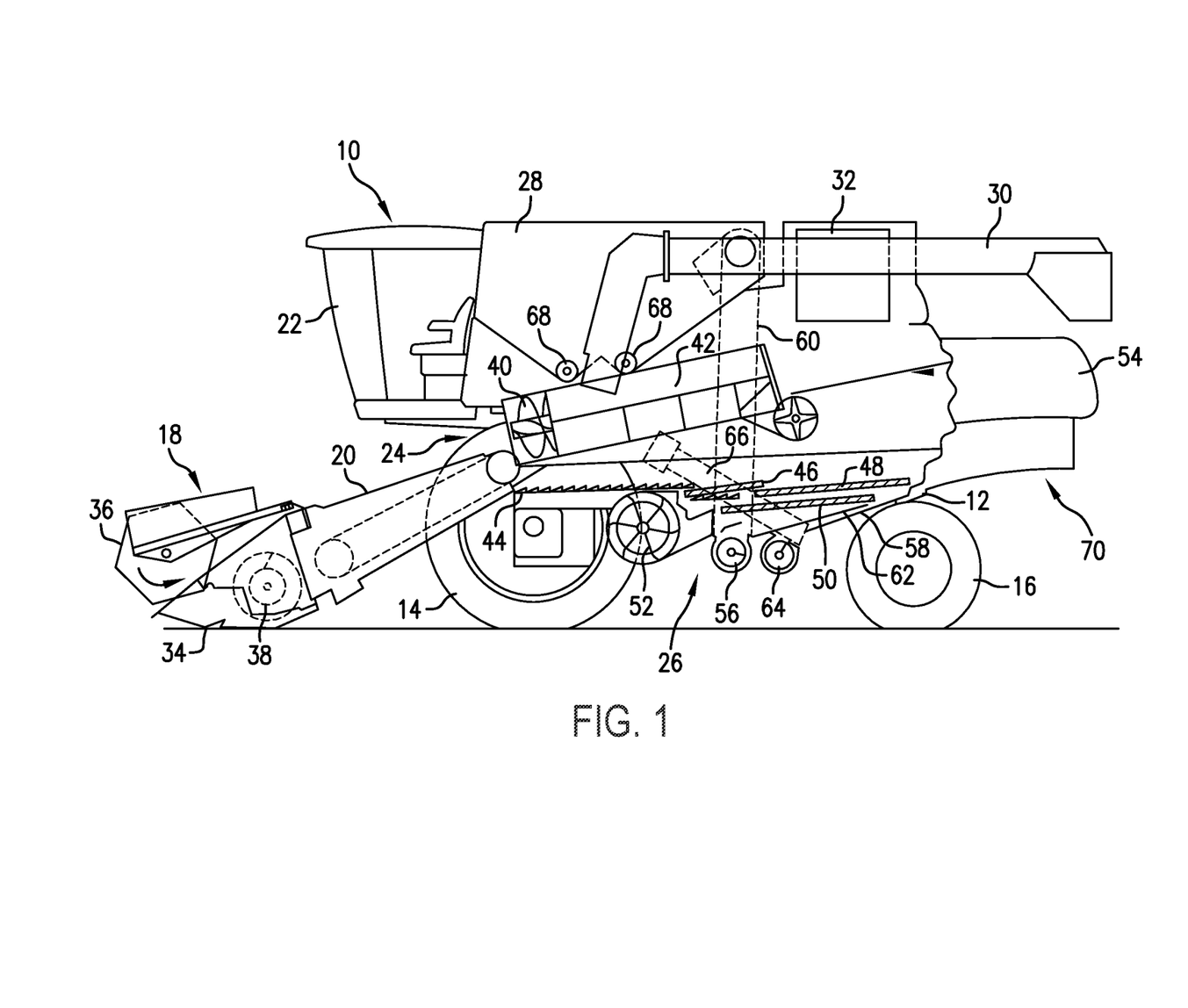
FIG. 1 is a side view of an embodiment of an agricultural harvester in the form of a combine.

As is described in U.S. Pat. No. 9,907,228, which is incorporated by reference herein in its entirety, FIG. 1 depicts an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc. Motive force is selectively applied to front wheels 14 through a power plant in the form of a diesel engine 32 and a transmission (not shown).

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24.

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

Figure 2:
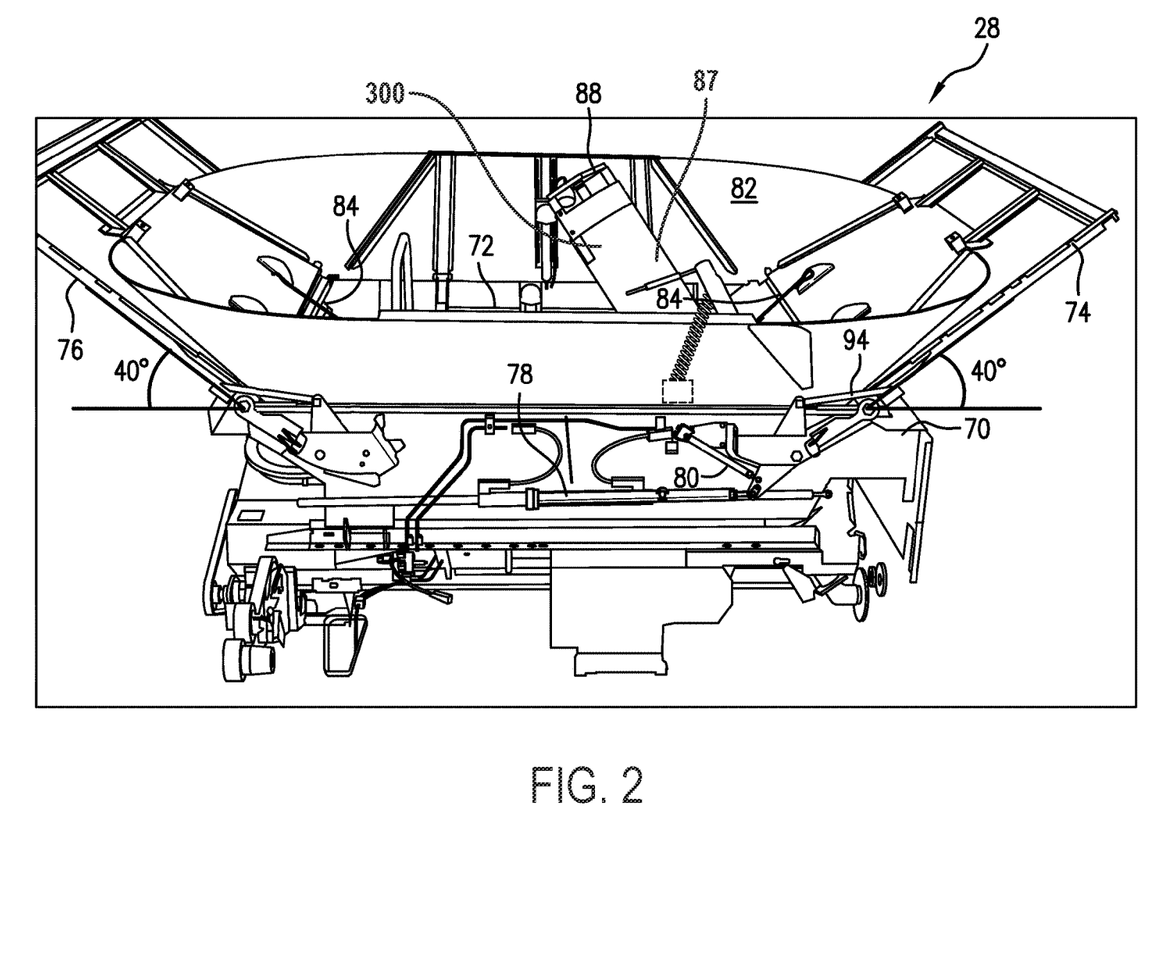
FIG. 2 is a side view of a grain tank of the combine of FIG. 1 with tank cover sections shown in an open position.

FIG. 2 depicts grain tank 28, which includes frame 70 having an opening 72 formed therethrough, a pair of tank cover sections 74 and 76 that are movably associated with the frame 70, an actuator 78 linked to the tank cover section 74, and a force assistor 80 linked to the tank cover section 74. The tank cover section 74 is connected to front and rear covers of the grain tank 28 by a linkage system (not shown) inside the grain tank 28, so that the tank cover section 74 and front and rear covers always move together. As can be seen, the frame 70 forms the body of the grain tank 28 and can be expanded by the tank cover sections 74 and 76, the front and rear covers, a bubble up extension, as well as an expandable element 82 that is raised and lowered with the tank cover sections 74 and 76. In this sense, the capacity of the grain tank 28 can be increased by raising the tank cover sections 74 and 76 as well as the expandable element 82, which is shown as four rubber corners moving together with the tank cover sections 74 and 76.

The tank cover sections 74 and 76, as well as the unnumbered front and rear covers, are movably associated with the frame 70 so that they can switch between an open position (shown in FIG. 2), and a covering position (not shown) relative to the opening 72. As shown, the tank cover sections 74 and 76 are hinged to the frame 70 by hinges 84 so the tank cover sections 74 and 76 can pivot about axes of rotation defined by the hinges 84 to an opening angle relative to the opening 72, shown as 40 degrees in FIG. 2. While the tank cover sections 74 and 76 are shown as being hinged to the frame 70, it is contemplated that the tank cover sections 74 and 76 could be movably associated with the frame 70 in other ways, such as by sliding.

A bubble up auger 300 is mounted to the tank cover section 74 so that as the tank cover section 74 pivots about its hinge 84, the bubble up auger 300 can be raised and lowered within the grain tank 28 relative to the opening 72. This allows for an output end 88 of the bubble up auger 300 to raise and lower as the capacity of the grain tank 28 changes, which can correspond to increasing and decreasing amounts of grain held within the grain tank 28. This is important for fill distribution and to lower power consumption by preventing the output end 88 from being buried under too much grain or being held too high above the grain level.

The details regarding movement of tank cover sections 74 and 76 may vary from that which are shown and described herein.

Bubble up auger 300 moves the grain towards the center of the grain tank 28. At the end of the bubble up auger 300 the grain is discharged into the grain tank's center. Auger 300 generally includes an auger having flights that are surrounded by a tube 87 (shown in FIG. 2, only). Bubble up auger 300 is hinged near the base of the auger so that the auger can rotate or pivot to a transport, or substantially horizontal position. Further details regarding bubble up auger 300 will be described hereinafter.

Figure 3:
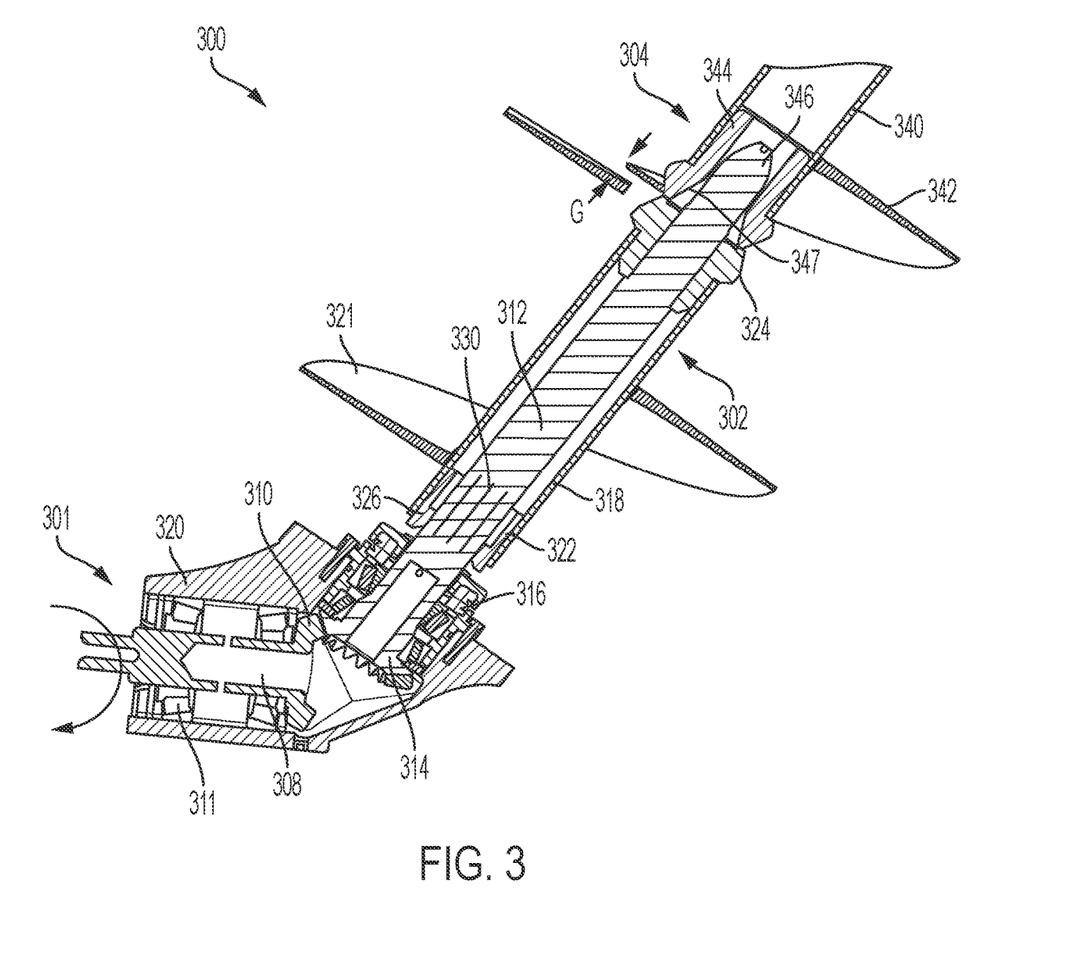
FIG. 3 is a cross-sectional view of a portion of the bubble up auger of the grain tank of FIG. 2.

FIG. 3 depicts a cross-sectional view of the bottom portion of bubble up auger 300. Auger 300 comprises a gearbox assembly 301, a lower auger portion 302 and an upper auger portion 304. The outer tubes 87 surrounding portions 302 and 304, respectively, are not shown in FIG. 3. Upper portion 304 is hingedly connected with respect to lower portion 302 and is movable between a connected (or raised) position shown in FIG. 3, and a disconnected (or folded) position shown in FIGS. 4A-4C. A hinge (not shown) connects upper portion 304 to another surface on grain tank 28, for example. In the connected position shown in FIG. 3, lower and upper portions 302 and 304 are connected such that they are at least partially non-rotatably connected together and, therefore, rotate together. In the disconnected position shown in FIG. 3, upper portion 304 cannot rotate because it is disconnected and cannot receive power from lower portion 302.

Gearbox assembly 301 generally comprises an input gear shaft 308 having a bevel wheel 310 at one end thereof; a bearing assembly 311 surrounding the gear shaft 308; an output shaft 312 having a bevel wheel 314 at a connection end thereof that is obliquely positioned to mesh with teeth of bevel wheel 310 of input gear shaft 308; a bearing assembly 316 surrounding the connection end of gear shaft 308; and a housing 320 including a hollow region for accommodating the aforementioned components of assembly 301. Housing 320 may be fixedly connected to tank 28 or another surface of combine 10.

Lower portion 302 of auger 300 comprises an auger having a hollow tube 318; flights 321 extending helically about tube 318; a lower annular coupling 322 welded (or otherwise fixed) to the lower inside surface of tube 318; and an upper annular coupling 324 welded (or otherwise fixed) to the upper inside surface of tube 318. Flights 321 may be welded or otherwise fixed to tube 318.

Output shaft 312 is positioned through the entirety of tube 318. Thus, the tube 318 is supported by the shaft 312 in the radial direction. Accordingly, a bearing at the top end of tube 318 is not required for radial support. Because a bearing can be omitted, a bearing hanger supporting the bearing can also be omitted.

Shaft 312 also passes through lower coupling 322 of lower portion 302. Lower coupling 322 ensures a coaxial relationship between lower portion 302 and output shaft 312. A series of axially extending splines 326 are disposed on the interior facing surface of lower coupling 322. Splines 326 mesh with and engage axially extending splines 330 formed on the outer surface of shaft 312. In assembled form, components 312, 322 and 318 rotate together due to the splined connection. Splines may be machined or otherwise formed on their respective base surfaces. Although not shown, it is envisioned that shaft 312 could be integrated with tube 318, and the splined connection may be omitted.

The connection between shaft 312 and coupling 322 of lower portion 302 is a sliding fit (i.e., sliding in the axial direction). The sliding fit has a minimum clearance to permit the connection between coupling 322 and shaft 312 without pressing the lower portion 302 onto shaft 312. Lower portion 302 and shaft 312 may be coupled together by a pin or bolt (not shown), if so desired, to prevent lower portion 302 from detaching from shaft 312 in the axial direction.

Shaft 312 also passes through upper coupling 324 of lower portion 302. Upper coupling 324 further ensures a coaxial relationship between lower portion 302 and output shaft 312, which eliminates the need for a bearing and bearing hanger at the top end of portion 302.

Figure 4A:
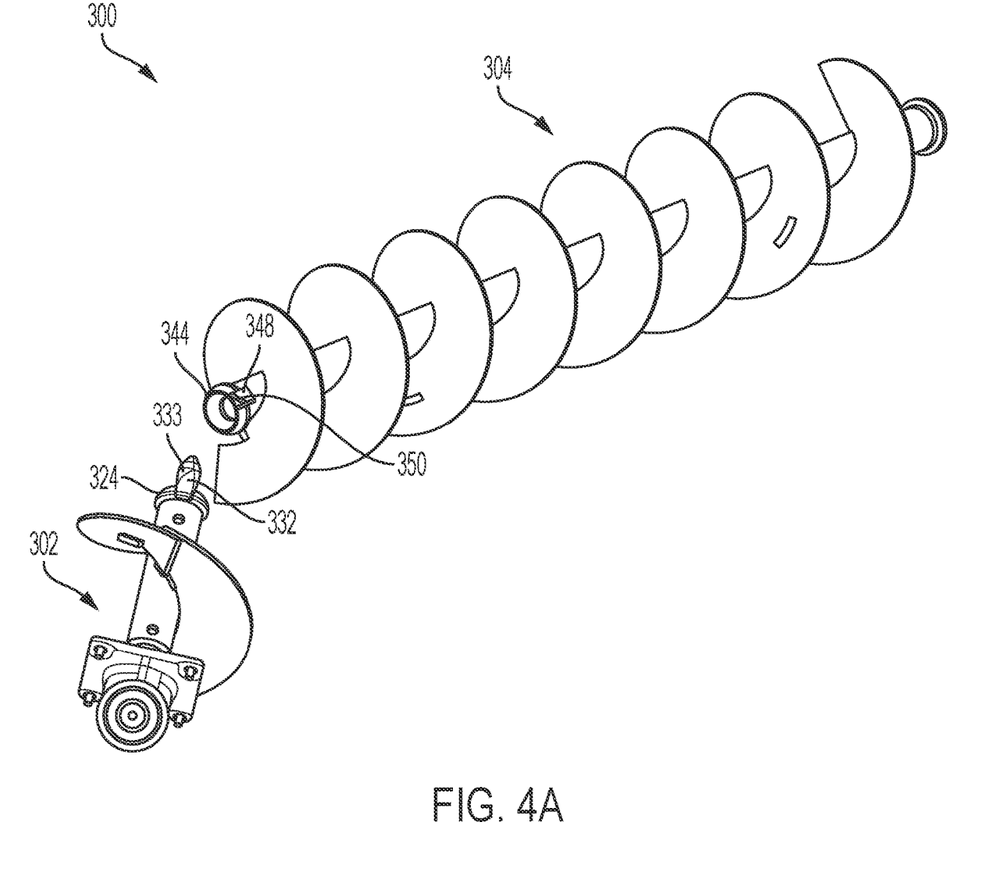
FIGS. 4A and 4B are isometric views of the bubble up auger of FIG. 3 shown in a folded position.
Figure 4B:
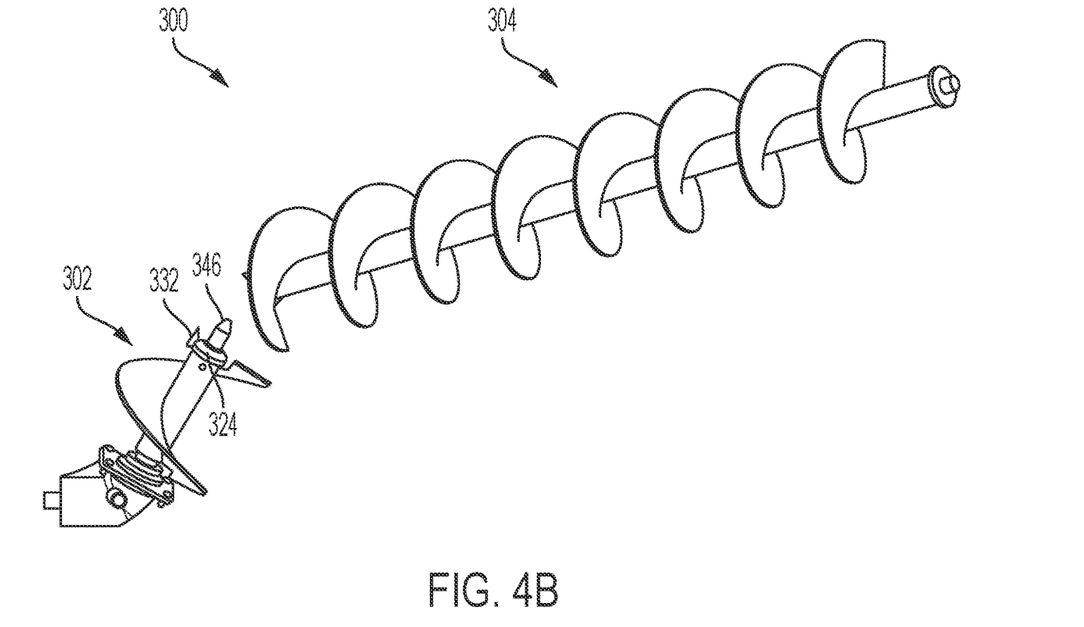
Figure 4C:
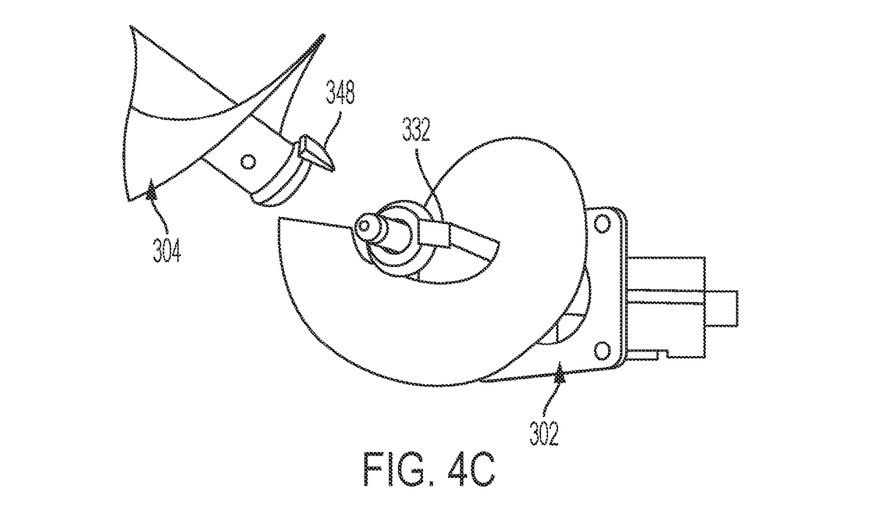
FIG. 4C is a detailed isometric view of the bubble up auger of FIG. 3 shown in a folded position.

As best shown in FIGS. 4A-4C, upper coupling 324 comprises one or more trapezoidal shaped teeth 332 (one shown) extending in an axial direction above the top surface of coupling 324. The top end 333 of tooth 332 is angled (i.e., slanted) with respect to a longitudinal axis of tube 318 as well as a top surface of coupling 324. The top surface of coupling 324 is either conical, rounded, semi-conical or frusto-conical.

Turning back to FIG. 3, upper portion 304 of auger 300 comprises an auger having a hollow tube 340; flights 342 extending helically about tube 340; and an annular coupling 344 welded (or otherwise fixed) to the lower inside surface of tube 340. Flights 342 may be welded or otherwise fixed to tube 340.

As best shown in FIGS. 4A-4C, like the coupling 324, the coupling 344 also comprises one or more trapezoidal shaped teeth 348 (one shown) extending in an axial direction beyond the lower surface of coupling 344. The bottom end 350 of tooth 348 is angled (i.e., slanted) with respect to a longitudinal axis of tube 340 as well as a bottom surface of coupling 344. The surfaces 350 and 333 of the mating teeth are angled such that if upper portion 304 is moved to the connection position shown in FIG. 3 and those surfaces 350 and 333 are rotationally aligned, then those surfaces 350 and 333 will simply slide past each other thereby permitting upper portion 304 to move to the fully connected position.

Once the upper portion 304 is moved to the connected position shown in FIG. 3 and the auger 300 is operated, the side surfaces of teeth 348 and 332 will bear on each other such that rotation of lower portion 302 will result in rotation of upper portion 304.

By virtue of the teeth 348 and 332, the upper and lower portions are partially non-rotatably connected together. The portions are said to be "partially" non-rotatably connected together because the portions can rotate with respect to each other by a slight degree until the side surfaces of teeth 348 and 332 bear on each other. And, once the side surfaces of teeth 348 and 332 bear on each other, the upper and lower portions are non-rotatably connected together. As an alternative to teeth 348 and 332, shaft 312 may be non-rotatably connected to tube 340 by way of splines, pins, fasteners or other means.

The bottom surface of coupling 344 is either conical, rounded, semi-conical or frusto-conical for receiving and engaging with the conical surface of mating coupling 324. The conical mating surfaces of the couplings 324 and 344 enhances the radial rigidity at the interface between those couplings. Coupling 344 includes a central passage that is configured to releasably receive the free and tapered end 346 of shaft 312. Positioning at least a portion of shaft 312 within that central passage aids in coaxially aligning upper portion 304 with respect to lower portion 302 and gearbox 301. This also minimizes runout between shaft 312 and the auger portions 302 and 304. And, minimizing runout ensures that the center of gravity of the auger portions 302 and 304 lies on the rotational axis. An interior chamfer 347 (or countersink) is formed at the entrance of the interior diameter of coupling 344 so that upper portion 304 can clear the end 346 of shaft 312 as the upper portion 304 moves between the connected and disconnected positions.

As noted in the background section, the ends of the upper and lower auger portions 302 and 304 typically include bearings and hangers for those bearings. Such bearing and hangers add cost, complexity and reduce efficiency. Specifically, bearing hangers can create interruptions and flow restrictions that increase wear on auger components. These interruptions also consume more power throughout the grain handling system. Bearings consume power (i.e., windage losses) as they are often filled with oil or grease that consume power to overcome the fluid friction forces (hydro-dynamic forces). Bubble up auger 300 does not suffer from such drawbacks.

Bearings and hangers are normally positioned at the intersection between auger portions of a bubble up auger, as noted above. Because auger 300 does not include bearings and hangers at the intersection between auger portions 302 and 304, the gap 'G' (FIG. 3) between the flightings 321 and 342 is minimized and maintained as small as possible. Maintaining a small gap G is beneficial for enhanced grain flow from auger portion 302 to auger portion 304, and less grain damage.

In operation, input gear shaft 308 may be powered by an electric motor, hydraulic motor, or gear that is indirectly connected to engine 32. Rotation of gear shaft 308 causes rotation of shaft 312 by way of the meshed gear teeth of the wheels 310 and 314. Rotation of shaft 312 results in rotation of lower auger portion 302 by way of the splined connection, and rotation of lower auger portion 302 results in rotation of upper auger portion 304 by way of the connection between the teeth 332 and 348 on the mating couplings.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A bubble-up auger for an agricultural vehicle, said bubble-up auger comprising:
   a unitary rotatable shaft;
   a lower auger section either mounted to or forming part of the unitary rotatable shaft;
   an upper auger section that is removably connected to the lower auger section, and includes an opening through which the unitary rotatable shaft is at least partially positioned, wherein the upper auger section is moveable between a first position where the upper auger section is detached from the lower auger section and a second position where the upper auger section is connected to the lower auger section,
   wherein the lower auger section comprises (i) a lower auger tube having two opposing ends and a passage extending between the ends through which the unitary rotatable shaft is positioned, (ii) a first coupling being disposed at one of the two opposing ends and non-rotatably connecting the unitary rotatable shaft to the lower auger tube, and (iii) a second coupling being mounted at the other of the two opposing ends and non-rotably connected to the lower auger tube, wherein the unitary rotatable shaft passes through an opening in the second coupling,
   wherein the upper auger section comprises an upper auger tube having two opposing ends, and a third coupling mounted at one of the two opposing ends,
   wherein, when the upper auger section is maintained in the second position, the third coupling is at least partially non-rotatably connected to the second coupling and the unitary rotatable shaft passes through an opening in the third coupling such that the unitary rotatable shaft is at least partially positioned within the upper auger tube.

2. The bubble-up auger of claim 1, wherein the auger does not include a bearing at an intersection between the lower auger section and the upper auger section.

3. The bubble-up auger of claim 1, wherein the first coupling is non-rotatably connected to the unitary rotatable shaft by a splined connection.

4. The bubble-up auger of claim 1, wherein the lower auger tube is slideably connected to the unitary rotatable shaft by a sliding fit connection.

5. The bubble-up auger of claim 1 further comprising a tooth extending from the second coupling, wherein the tooth is configured to interact with a tooth extending from the upper auger section, wherein each tooth includes a free end in the form of an angled surface.

6. The bubble-up auger of claim 1, wherein the third coupling includes an interior surface having a chamfer or a counterbore for accommodating movement of the third coupling with respect to a free end of the unitary rotatable shaft.

7. The bubble-up auger of claim 1, wherein the upper and lower auger sections each include flightings, wherein the flightings of the upper auger section is positioned directly adjacent the flightings of the lower auger section.

8. The bubble-up auger of claim 7, wherein no bearings are positioned between the flightings of the upper and lower auger sections.

9. The bubble-up auger of claim 1 further comprising a bevel gear set, wherein one of the gears of the bevel gear set is either connected to or forms part of the unitary rotatable shaft.

10. The bubble-up auger of claim 9, further comprising a housing defining an interior space in which the bevel gear set is at least partially positioned.

11. The bubble-up auger of claim 10 further comprising bearings positioned within the housing, wherein one bearing is associated with one gear of the bevel gear set, and another bearing is associated with the other gear of the bevel gear set.

12. The bubble-up auger of claim 10 wherein the unitary rotatable shaft is at least partially mounted within the housing.

13. An agricultural harvester comprising the bubble-up auger of claim 1.

14. A grain tank for the agricultural vehicle comprising the bubble-up auger of claim 1.

* * * * *